United States Patent
Seo et al.

(10) Patent No.: US 10,560,173 B2
(45) Date of Patent: Feb. 11, 2020

(54) METHOD FOR TRANSMITTING AN RECEIVING DOWNLINK SIGNAL IN WIRELESS COMMUNICATION SYSTEM, AND APPARATUS THEREFOR

(71) Applicant: LG ELECTRONICS INC., Seoul (KR)

(72) Inventors: Inkwon Seo, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/318,355

(22) PCT Filed: Aug. 3, 2017

(86) PCT No.: PCT/KR2017/008369
§ 371 (c)(1),
(2) Date: Jan. 16, 2019

(87) PCT Pub. No.: WO2018/030708
PCT Pub. Date: Feb. 15, 2018

(65) Prior Publication Data
US 2019/0158170 A1    May 23, 2019

Related U.S. Application Data

(60) Provisional application No. 62/373,346, filed on Aug. 10, 2016, provisional application No. 62/421,997, filed on Nov. 14, 2016.

(51) Int. Cl.
*H04L 5/12*     (2006.01)
*H04B 7/06*    (2006.01)
*H04J 11/00*   (2006.01)

(52) U.S. Cl.
CPC ......... *H04B 7/0639* (2013.01); *H04B 7/0695* (2013.01); *H04J 11/0023* (2013.01);
(Continued)

(58) Field of Classification Search
CPC ..... H04B 7/0639; H04B 7/0695; H04J 11/00; H04J 11/0023; H04J 2011/0006; H04J 2011/0016
(Continued)

(56) References Cited

U.S. PATENT DOCUMENTS

| 2011/0038310 A1 | 2/2011 | Chmiel et al. |
| 2011/0038344 A1* | 2/2011 | Chmiel ................ H04W 48/08 370/330 |

(Continued)

FOREIGN PATENT DOCUMENTS

| KR | 1020110050502 | 5/2011 |
| KR | 1020140110759 | 9/2014 |
| KR | 1020150016913 | 2/2015 |

OTHER PUBLICATIONS

PCT International Application No. PCT/KR2017/008369, Written Opinion of the International Searching Authority dated Oct. 30, 2017, 20 pages.

*Primary Examiner* — Helene E Tayong
(74) *Attorney, Agent, or Firm* — Lee Hong Degerman Kang Waimey

(57) ABSTRACT

A method for a terminal, in a wireless communication system, receiving a downlink signal from a cell in which a plurality of beams are multiplexed according to an embodiment of the present invention comprises the steps of: generating a quasi-orthogonal scrambling sequence that is used for scrambling the downlink signal; and receiving the downlink signal through one or more beams of the plurality of multiplexed beams using the generated quasi-orthogonal scrambling sequence, wherein the terminal can initialise the
(Continued)

quasi-orthogonal scrambling sequence using a beam-specific parameter corresponding to one or more beams for transmitting the downlink signal when generating the quasi-orthogonal scrambling sequence.

15 Claims, 9 Drawing Sheets

(52) U.S. Cl.
CPC ............... *H04J 2011/0006* (2013.01); *H04J 2011/0016* (2013.01)

(58) Field of Classification Search
USPC .......................................................... 375/262
See application file for complete search history.

(56) References Cited

U.S. PATENT DOCUMENTS

| | | | |
|---|---|---|---|
| 2013/0148538 A1* | 6/2013 | Ohwatari | H04B 7/0865 370/252 |
| 2013/0308555 A1* | 11/2013 | Ho | H04L 5/0048 370/329 |
| 2014/0098689 A1* | 4/2014 | Lee | H04B 7/0469 370/252 |
| 2014/0254517 A1* | 9/2014 | Nam | H04B 7/0417 370/329 |
| 2014/0334454 A1 | 11/2014 | Nogami et al. | |
| 2016/0197659 A1* | 7/2016 | Yu | H04W 16/28 370/335 |

* cited by examiner

METHOD FOR TRANSMITTING AN RECEIVING DOWNLINK SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/008369, filed on Aug. 3, 2017, which claims the benefit of U.S. Provisional Application No. 62/373,346, filed on Aug. 10, 2016, and 62/421,997, filed on Nov. 14, 2016, the contents of which are all hereby incorporated by reference herein in their entirety.

TECHNICAL FIELD

The present invention relates to a wireless communication system and, more particularly, to a method of transmitting or receiving a downlink signal through beamforming and an apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a new RAT considering eMBB, mMTC and URLLC has been discussed for next generation wireless communication.

DETAILED DESCRIPTION OF THE INVENTION

Technical Problems

An object of the present invention is to provide a method of transmitting or receiving a downlink signal through a plurality of multiplexed beams in a wireless communication system and an apparatus for performing the same.

The objects of the present invention are not limited to what has been particularly described hereinabove and other objects not described herein will be more clearly understood from the embodiments of the present invention.

Technical Solutions

According to an aspect of the present invention, provided herein is a method of receiving a downlink signal from a cell in which a plurality of beams are multiplexed by a user equipment (UE) in a wireless communication system, including generating a quasi-orthogonal scrambling sequence used for scrambling the downlink signal; and receiving the downlink signal through at least one beam among the multiplexed plurality of beams, using the generated quasi-orthogonal scrambling sequence, wherein in the generation of the quasi-orthogonal scrambling sequence, the UE initializes the quasi-orthogonal scrambling sequence using a beam-specific parameter corresponding to the at least one beam for transmitting the downlink signal.

In another aspect of the present invention, provided herein is a user equipment (UE) for receiving a downlink signal from a cell in which a plurality of beams are multiplexed, including a processor configured to generate a quasi-orthogonal scrambling sequence used for scrambling the downlink signal; and a receiver configured to receive the downlink signal through at least one beam among the multiplexed plurality of beams, using the generated quasi-orthogonal scrambling sequence, according to control of the processor, wherein in the generation of the quasi-orthogonal scrambling sequence, the processor initializes the quasi-orthogonal scrambling sequence using a beam-specific parameter corresponding to the at least one beam for transmitting the downlink signal.

In another aspect of the present invention, provided herein is a method of transmitting a downlink signal by a base station (BS) having a cell in which a plurality of beams are multiplexed in a wireless communication system, including generating a quasi-orthogonal scrambling sequence in consideration of at least one beam through which the downlink signal is to be transmitted among the multiplexed plurality of beams; scrambling the downlink signal using the generated quasi-orthogonal scrambling sequence; and transmitting the downlink signal through at least one beam to a user equipment (UE), wherein in the generation of the quasi-orthogonal scrambling sequence, the BS initializes the quasi-orthogonal scrambling sequence using a beam-specific parameter corresponding to the at least one beam for transmitting the downlink signal.

In another aspect of the present invention, provided herein is a base station (BS) having a cell in which a plurality of beams are multiplexed, including a processor configured to generate a quasi-orthogonal scrambling sequence in consideration of at least one beam through which a downlink signal is to be transmitted among the multiplexed plurality of beams and scramble the downlink signal using the generated quasi-orthogonal scrambling sequence; and a transmitter configured to transmit the downlink signal through at least one beam to a user equipment (UE) according to control of the processor, wherein in the generation of the quasi-orthogonal scrambling sequence, the processor initializes the quasi-orthogonal scrambling sequence using a beam-specific parameter corresponding to the at least one beam for transmitting the downlink signal.

The beam-specific parameter may be a beam index allocated to the at least one beam.

The quasi-orthogonal scrambling sequence may be initialized using '$n_{beamID}*2^X$', where '$n_{beamID}$' may represent the beam index, and 'X' may be a value determined based on the maximum number of the multiplexed plurality of beams.

The UE may receive '$n_{beamID}$' for each of the plurality of beams from the cell.

The UE may receive information about a relative position of a subband that the UE monitors in a system band of the cell.

In the generation of the quasi-orthogonal scrambling sequence, the UE may generate an entire quasi-orthogonal scrambling sequence having a length corresponding to a system band of the cell and extract a part corresponding to the relative position of the subband that the UE monitors from the entire quasi-orthogonal scrambling sequence.

The downlink signal may be downlink control information or a downlink reference signal and the UE may descramble the downlink control information or estimate a channel on which the downlink reference signal is received, using the quasi-orthogonal scrambling sequence.

Beams having a correlation less than a threshold value among the plurality of beams may be multiplexed by a spatial divisional multiplexing (SDM) scheme using the quasi-orthogonal scrambling sequence and beams having a correlation greater than the threshold value may be multiplexed by at least one of frequency divisional multiplexing (FDM), time divisional multiplexing (TDM), and code divisional multiplexing (CDM) schemes.

Advantageous Effects

According to an embodiment of the present invention, since a quasi-orthogonal scrambling sequence is initialized through a beam-specific parameter when a downlink signal is transmitted and received through a plurality of multiplexed beams, interference between beams can be reduced even when the plural beams are multiplexed within one cell.

Effects according to the present invention are not limited to what has been particularly described hereinabove and other advantages not described herein will be more clearly understood from the embodiments of the present invention.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A system

Figure 1:
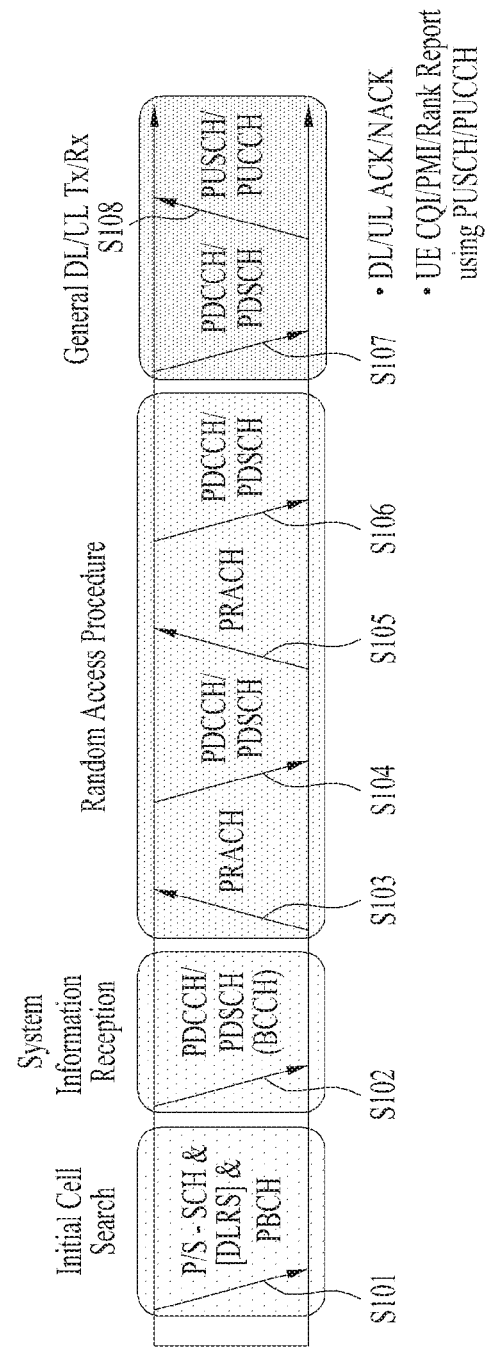
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
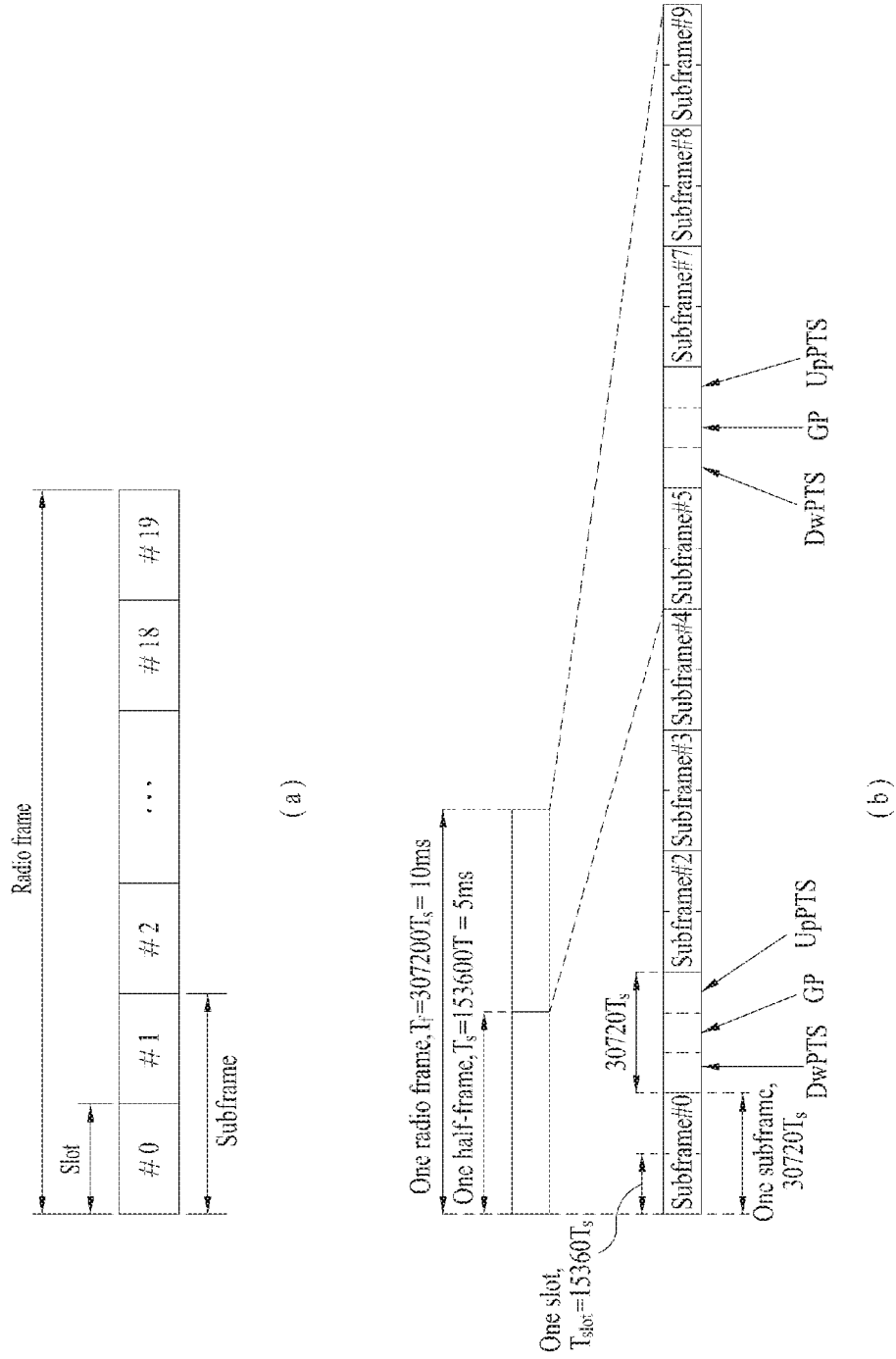
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
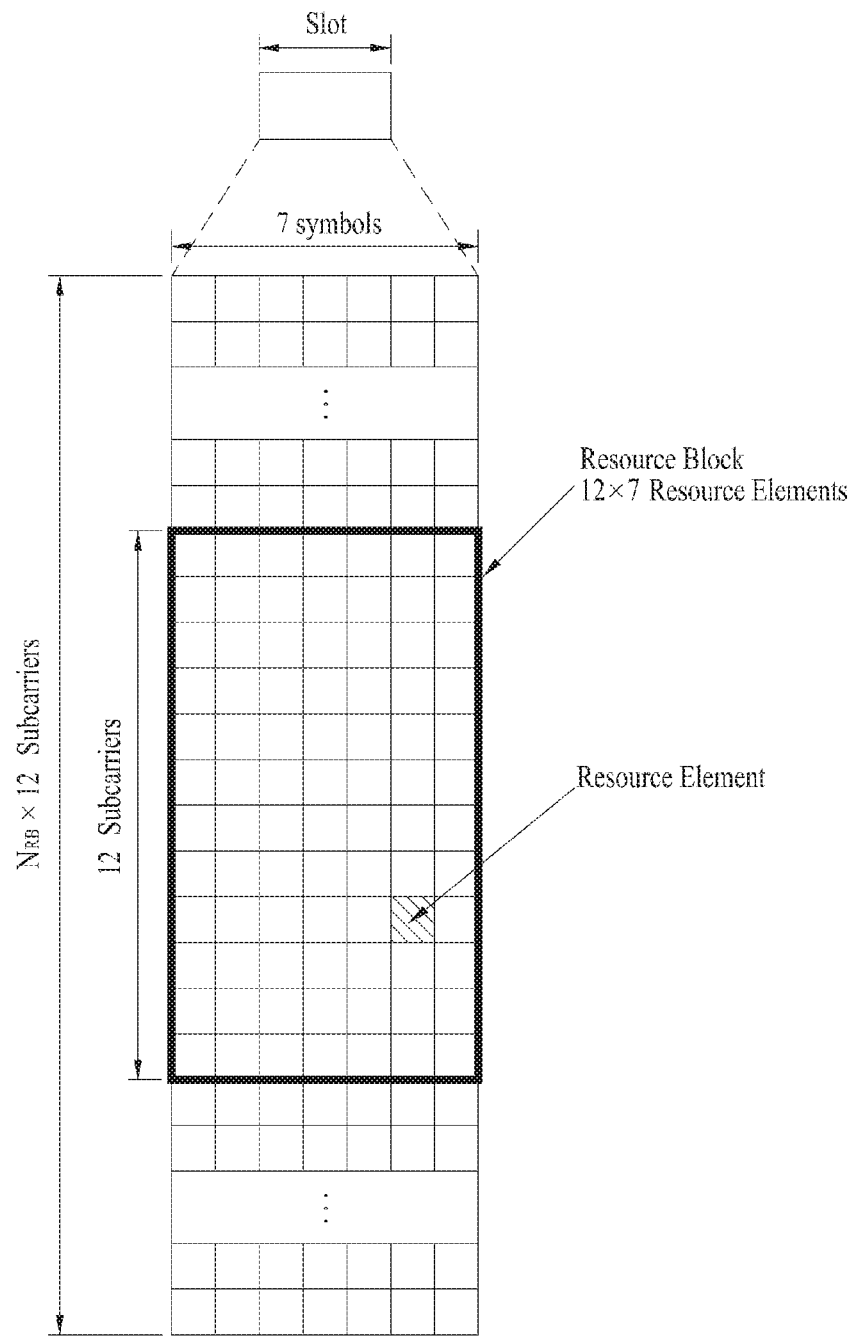
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
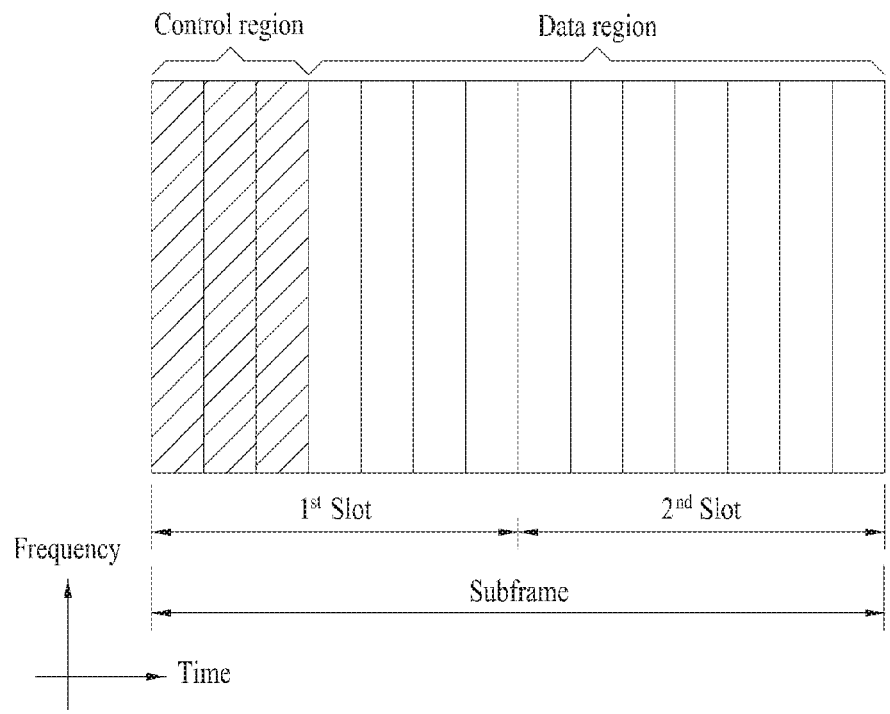
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
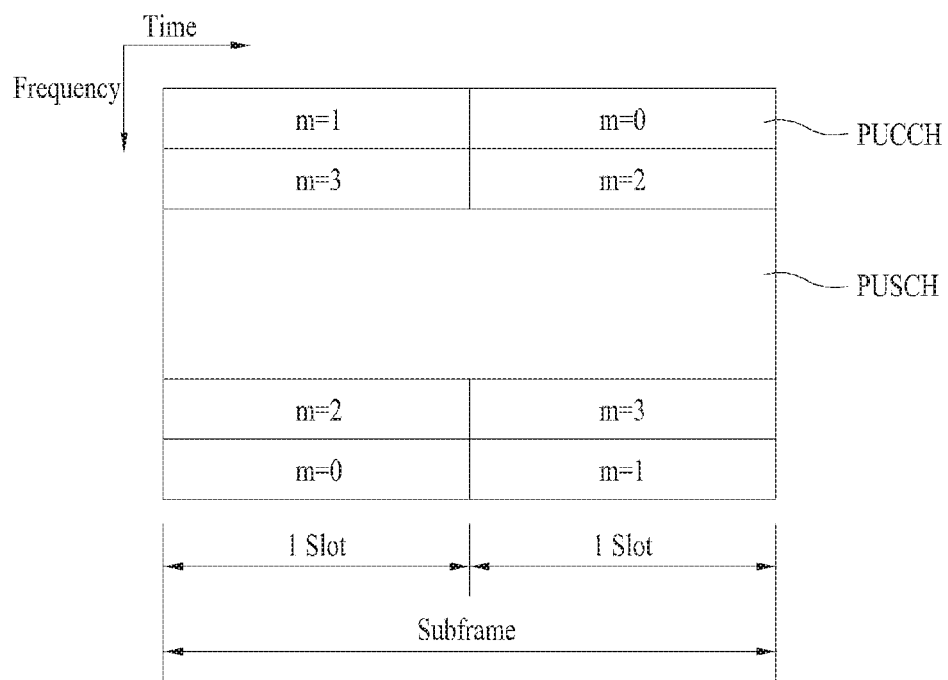
FIG. 5 is a diagram for a structure of an uplink subframe for 3GPP LTE/LTE-A system.

FIG. 5 is a diagram for an example of a structure of an uplink subframe.

Referring to FIG. 5, an uplink subframe includes a plurality of slots (e.g., 2 slots). A slot may include a different number of SC-1-DMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/ or CSI (Channel State Information)s.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
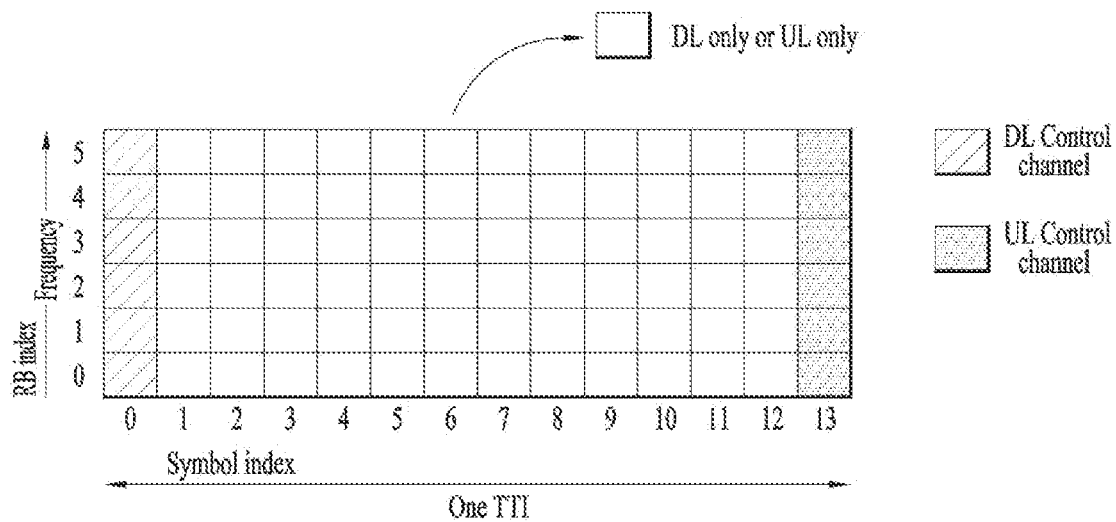
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
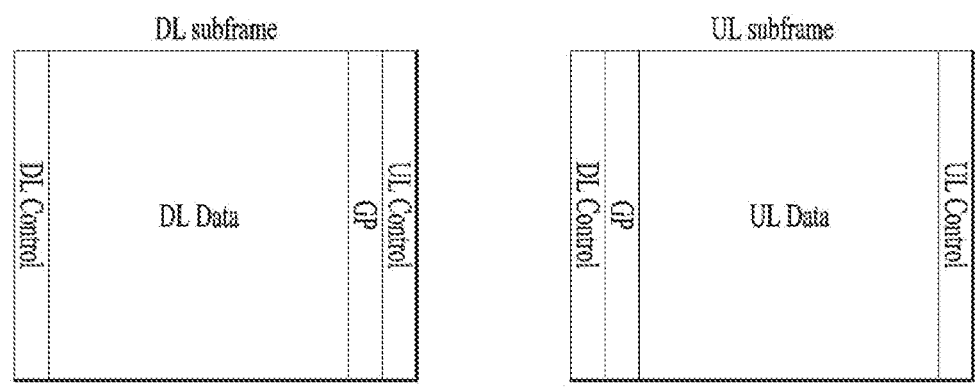
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe, and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

<Multiplexing Method for Control Information/Reference Signal (RS)>

In new RAT (NR), an analog beam may be introduced. When transmission/reception through a plurality of analog beams is performed in one subframe, it is necessary to distinguish between the beams.

An embodiment of the present invention proposes a method of distinguishing between beams and a method of transmitting control channels when multiple analog beams transmit respective control channels in the same resource (e.g., the same subframe).

In the following description, the meaning of "scrambling is performed on control information" implies that scrambling is applied to an encoded bit after channel coding of the control information. Although the following description is given based on analog beams, embodiments of the present invention may be applied to multiplexing of digital beams or different layers.

[Control Information Multiplexing Method Between Different Analog Beams]

To multiplex control channels caused by multiple analog beams, i.e., to transmit altogether different control information (e.g., DCI) in a specific resource region, the following methods may be used.

(1) Space Division Multiplexing (SDM)

Control information transmitted by respective beams on the spatial domain may be distinguished using a quasi-orthogonal scrambling sequence and beam separation.

When a plurality of beams having a low correlation between beams are multiplexed by an SDM scheme, efficient multiplexing between beams may be implemented without additional resource waste.

When beams having a high correlation between beams are multiplexed by the SDM scheme, performance may be degraded due to inter-beam interference and flexibility of beam scheduling is lowered when it is desired to avoid performance degradation.

To apply SDM, a network may broadcast a mapping relationship between a scrambling parameter and an analog beam or inform a UE of the mapping relationship through higher layer signaling.

(2) Frequency Division Multiplexing (FDM)

FDM may imply that a frequency resource on which control information of each beam is transmitted in a control region is differently allocated. Alternatively, for FDM, the network may configure a unit resource with respect to resources of the control region and assign a unit resource index available for each analog beam. For example, when the concept of a control channel element (CCE) of LTE is used in NR, the network may implement the FDM (and/or TDM) scheme by configuring a CCE index available for each analog beam or configuring a different control resource set (CORESET) or a different search space with respect to each analog beam.

Since FDM can eliminate an effect of correlation between beams, flexibility is guaranteed when the network selects multiplexed analog beams in the same subframe and performance degradation caused by inter-beam interference can be avoided for the same reason.

On the other hand, since a frequency resource for each beam is separately defined, the FDM scheme is greatly lacking in a resource of each beam relative to the SDM scheme.

To apply FDM, the network may broadcast a mapping relationship between frequency resources and analog beams or inform the UE of the mapping relationship through higher layer signaling.

(3) Time Division Multiplexing (TDM)

TDM has advantages and disadvantages similar to those of FDM.

Additionally, in the case of TDM, if beams are distinguished in the time domain, control symbols equal in number to analog beams multiplexed in one subframe may be needed. Therefore, TDM may be inefficient in terms of time resource management. When the network uses a mixture of TDM and SDM, a time-domain resource may be allocated to each analog beam set. Beams within an analog beam set located on the same time-domain resource may be distinguished by the SDM scheme.

When TDM is used for the purpose of multiplexing control information for each beam, the network may broadcast a mapping relationship between an analog beam and a symbol index or inform the UE of the mapping relationship through higher layer signaling. For example, the network may signal beam pair link (BPL) configuration at the symbol level. The BPL implies a correlation relationship in which a transmission beam of an eNB and a reception beam of a UE are paired and the network may signal the BPL by signaling at least one beam index among the transmission beam and the reception beam constituting a pair.

(4) Code Division Multiplexing (CDM)

As compared with other multiplexing schemes, CDM is disadvantageous in that resource consumption increases due to a spreading factor.

On the other hand, CDM facilitates maintenance of orthogonality and may achieve interference mitigation caused by spreading.

If CDM is applied to multiplexing of control information of beams, the network may broadcast a mapping relationship between a spreading factor, an analog beam, and a code index or signal the mapping relationship to the UE. As an example, the network may define a code length for CDM as 4 and broadcast the mapping relationship between analog beams and code indices of 0, 1, 2, and 3 or UE-specifically signal the mapping relationship.

(5) Combination of Multiplexing Schemes

Control information of different analog beams may be multiplexed through a combination of the above-described multiplexing schemes. For example, the network may multiplex control information based on SDM, wherein FDM and/or TDM may be applied under the assumption that only control information of specific beam(s) is transmitted in a specific region.

As another embodiment, when the network transmits analog beams having a high correlation between beams in one subframe, the corresponding beams may be multiplexed by orthogonal multiplexing schemes such as FDM, TDM, CDM, etc. When the network transmits analog beams having a low correlation between beams in one subframe, resource efficiency may be improved and RS overhead may be reduced using SDM. To this end, the network may broadcast a scrambling parameter (e.g., scrambling initialization parameter) for SDM, frequency resource allocation information for FDM, symbol allocation information for TDM, and code length and code index information for CDM, for each beam/UE according to combination of multiplexing schemes, or inform the UE of the above information through higher layer signaling. In other words, parameters for each UE, that the UE should assume, may be configured. The above information may be configured with respect to each subframe, each slot, and/or each CORESET. For example, the network may signal whether SDM/FDM/TDM has been applied to a specific CORESET to the UE and signal parameters for each multiplexing scheme to the UE by being included in CORESET configuration.

[Scrambling Initialization of Control Information]

Cell ID based scrambling has been performed on control information of a legacy LTE PDCCH, for inter-cell interference randomization. The network may perform cell ID based scrambling on control information of an enhanced PDCCH (EPDCCH), wherein the network signals a scrambling ID (SCID) of each EPDCCH set for a coordinated multi-point transmission/reception (CoMP) operation and performs scrambling using the SCID. In this case, if EPDCCH sets are configured in different regions, this may be interpreted as introduction of FDM. That is, in legacy LTE, it is appreciated that SDM/FDM has basically been introduced to randomize inter-cell interference.

However, in NR, scrambling for randomizing inter-beam interference even in the same cell is needed due to introduction of an analog beam. Accordingly, an embodiment of the present invention newly proposes performing scrambling initialization of control information for analog beams using the following component(s). The following components may be used alone or by a combination thereof to perform scrambling initialization of control information or may be used as part of scrambling initialization of the control information. In examples below, X, Y, and Z may be set to 0 when necessary.

(1) $n_{beamID}*2^X$ $n_{beamID}*2^X$ may be used as a component for performing different scrambling initialization for each analog beam.

When SDM is applied to control information, $n_{beamID}*2^X$ may be used and this means that quasi-orthogonal scrambling is applied to each SDMed beam.

X may be configured according to definition of a beam index and may be determined based on the maximum number of beams that can be distinguished by the SDM scheme.

$n_{beamID}$ represents a beam ID. For example, the beam ID may be determined by the total number of beams that a corresponding eNB shows to the UE while performing beam sweeping. When the total number of beams is 112, X may be determined to be a value equal to or greater than 7. Alternatively, the beam ID may be determined to be the maximum number of supportable analog beams in each subframe. If the maximum number of analog beams usable in one subframe is 4, X may be determined to be a value equal to or greater than 2.

If beam indexing is performed based on the number of supportable analog beams in each subframe rather than all beams (e.g., when $n_{beamID}$ is defined as 0, 1, 2, or 3 under the assumption that up to 4 analog beams per subframe are transmitted and received), a mapping relationship between a specific analog beam and a beam index (e.g., 0, 1, 2, or 3) may be predefined. For example, mapping between the specific analog beam and the beam index may be predefined by performing a modulo operation by the number of supportable beams per subframe with respect to total beam indices. However, since it may be impossible to support analog beams having the same beam index in one subframe, the eNB desirably signals a beam index of each analog beam when beam association is performed between the eNB and the UE.

In the previous example, X may be determined to be 7 or greater or to be 2 or greater according to the number and type of components which should be considered when scrambling initialization is performed.

(2) $n_{ID}^{Cell}*2^Y$ $n_{ID}^{Cell}*2^Y$ may be used to randomize inter-cell interference or assign a virtual cell ID for a CoMP operation.

$n_{ID}^{Cell}$ represents a physical cell ID or a virtual cell ID. The physical cell ID may be simplified to a cell ID.

Y may be determined based on a larger value of a maximum value of the cell ID and a maximum value of the virtual cell ID. $n_{ID}^{Cell}$ may be determined by higher layer signaling or may be predefined such that a default value (e.g., physical cell ID) may be used when there is no signaling.

(3) $n_{SCID}*2^Z$ $n_{SCID}*2^Z$ may be used as a component for performing multi-user multiple-input and multiple-output (MU-MIMO) in the same beam.

$n_{SCID}$ represents a scrambling ID.

Z may be determined based on the maximum number of MU-MIMO users and may be predefined or may be transmitted to the UE through higher layer signaling or broadcast information.

[Control RS Multiplexing Method Between Different Analog Beams]

Similarly to the above-proposed multiplexing between control information of beams, multiplexing of an RS for demodulating control information transmitted by each analog beam should be defined. Particularly, since the RS is used for channel estimation, the RS may be more sensitive to inter-beam interference relative to data. Accordingly, it is desirable to maintain orthogonality of the RS. On the other hand, when an orthogonal RS is assigned to each analog beam, since resources for transmitting data may be insufficient due to increase in overhead caused by the RS, RS overhead and/or data resources should be considered.

The above-proposed multiplexing scheme of control information may be used for multiplexing of RSs of beams which may be simply summarized as follows. In the following description, signaling for RS multiplexing may be broadcast or may be transmitted through UE-specific or UE-group-specific higher layer signaling.

(1) SDM

Since RSs of respective beams are distinguished by a quasi-orthogonal scrambling sequence, the RSs may be mapped to the same RE. Therefore, RS overhead is relatively low.

When a correlation between analog beams performing transmission in one subframe is high, channel estimation performance may be deteriorated due to inter-beam interference. Accordingly, scheduling of the analog beams performing transmission in one subframe may be subject to restriction.

The network may signal a scrambling sequence parameter to the UE.

(2) FDM

Since RSs of respective beams are orthogonal in the frequency domain, channel estimation performance may be good relative to SDM due to reduction of interference between analog beams.

There is a disadvantage of increasing RS overhead according to the number of analog beams performing transmission in one subframe.

The network may signal an RS location of each analog beam in the frequency domain to the UE.

(3) TDM

Since RSs of respective beams are orthogonal in the time domain, channel estimation performance may be good relative to SDM due to reduction in interference between analog beams.

There is a disadvantage of increasing the number of control symbols according to the number of analog beams performing transmission in one subframe.

The network may signal an RS location of each analog beam in the time domain to the UE.

(4) CDM

RSs of different analog beams may be distinguished using spreading using an orthogonal code or using an orthogonal cover code (OCC).

It is desirable to minimize the distance between RSs belonging to respective beams in order to maintain orthogonality. For example, RSs may be continuously disposed in a resource unit (e.g., a physical resource block (PRB)) in the frequency domain. RS overhead increases according to the number of analog beams performing transmission in one subframe.

The network may signal an orthogonal code index applied to an RS of each analog beam to the UE.

(5) Combination of Multiplexing Schemes

RSs of beams may be multiplexed through a combination of a quasi-orthogonal multiplexing scheme (e.g., SDM) and an orthogonal multiplexing scheme (e.g., FDM or CDM).

As described previously, in the case of SDM, it is desirable to use analog beams having a low correlation between beams in one subframe and this may function as beam scheduling restriction. On the other hand, the orthogonal multiplexing scheme (e.g., CDM or FDM) may be effective when a correlation between beams is high. Accordingly, it is desirable to increase beam scheduling flexibility by combining SDM with FDM (or TDM or CDM).

For example, SDM may be applied to beams having a low correlation between beams and FDM may be applied to beams having a high correlation between beams, thereby increasing scheduling flexibility.

For this purpose, the network may signal information about a scrambling parameter, frequency/time resource allocation, and an orthogonal code index of an RS of each beam.

[RS Port Mapping in Analog Beam]

In NR, a transmission scheme of a control channel using each analog beam desirably supports 1-port beamforming transmission capable of obtaining beamforming gain and 2/4-port space-frequency block coding (SFBC) capable of obtaining transmission diversity gain. In addition, it is desirable to support MU-MIMO transmission of a control channel in order to satisfy massive connectivity which is one of requirements of NR. Considering the above description, multiplexing of RS ports in each analog beam may be performed as follows.

(1) SDM: Scrambling may be performed by a different parameter with respect to each RS port. To this end, a port index should be considered during control RS scrambling of NR.

(2) FDM: RS ports may be distinguishably mapped in the frequency domain.

(3) CDM: RS ports may be CDMed by an OCC.

[Scrambling Initialization of Control RS]

In LTE, a PDCCH is demodulated using a cell-specific reference signal (CRS) and an EPDCCH is demodulated using an EPDCCH demodulation reference signal (DMRS). Scrambling initialization of the CRS may be performed using a slot index, a symbol index, a cell ID, etc. Scrambling initialization of the EPDCCH DMRS is performed using a subframe index and a scrambling parameter of each EPDCCH set (e.g., an EPDCCH set for a CoMP operation) (e.g., a scrambling parameter signaled by a higher layer).

For control RS scrambling in NR, multiplexing between analog beams, MU-MIMO, and the CoMP operation are desirably considered. To this end, an embodiment of the present invention may use all or some of the following components for control RS scrambling. In addition, whether the following components are applied or not may be determined by a control RS multiplexing method between analog beams and an RS port multiplexing method in one analog beam.

(1) $n_{beamID}*2^X$

As described above in control information multiplexing, multiple analog beams may perform transmission in one subframe and $n_{beamID}*2^X$ may be used as a parameter for beams distinguished by SDM among corresponding beams.

When analog beams are multiplexed by combining the above-proposed two or more multiplexing schemes and only a part of analog beams performing transmission in a subframe are SDMed, the total number of $n_{beamID}$ may be reduced. In this case, the network needs to signal a mapping relationship between an analog beam and a beam index to the UE. For example, it is assumed that beam indices in a subframe in which beam sweeping is performed (e.g., a synchronization subframe or a beam reference signal (BRS) subframe) are 0 to 111 (e.g., when one subframe is defined as 14 symbols and 8 analog beams per symbol are transmitted), 8 analog beams are supported in a subframe in which control information is transmitted, and 8 analog beams are multiplexed using 4 quasi-orthogonal sequences and two FDMed resources. In this case, which scrambling sequence is used for the 8 analog beams should be predefined or should be transmitted to the UE through higher layer signaling or a broadcast signal.

(2) $n_{portID}*2^Y$

When a multiplexing method of RS ports defined in one analog beam is SDM, the network may reflect a port index $n_{portID}$ in an RS scrambling sequence. A mapping relationship between each RS port and the port index $n_{portID}$ may be predefined or may be transmitted to the UE through higher layer signaling.

(3) Parameters for CoMP/MU-MIMO

In addition to the above two components, $n_{ID}^{Cell}$ for a CoMP operation proposed in control information scrambling and $n_{SCID}$ for an MU-MIMO operation may be used for RS scrambling.

[Example of RS Multiplexing]

Figure 8:
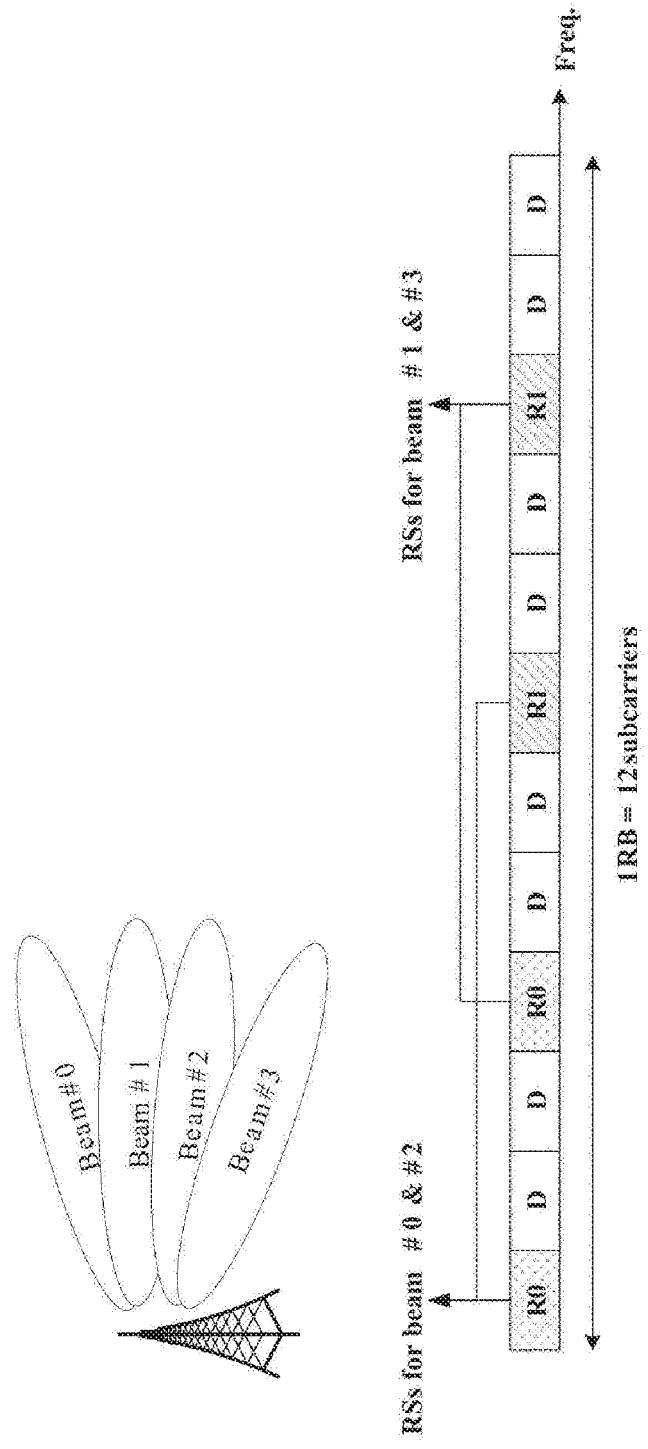
FIG. 8 illustrates an embodiment of multiplexing of RSs transmitted through analog beams.

FIG. 8 illustrates an embodiment of multiplexing of RSs of analog beams proposed above.

In FIG. 8, it is assumed that analog beams #0 to #3 perform transmission in one subframe and a correlation between adjacent beams is high.

If the embodiment of the present invention is applied to FIG. 8, RSs of beam#0 and beam#2 having a low correlation between the beams may be multiplexed by the SDM scheme and, in the same manner, beam#1 and beam#3 may be multiplexed by the SDM scheme. It is assumed that RSs of beam#0 and beam#1 having a high correlation between the beams are FDMed. In addition, two RS ports are present in the same beam and FUM is applied to the RS ports.

If RSs of beams are multiplexed as illustrated in FIG. 8, a scrambling parameter (e.g., $n_{beamID}$) is needed to distinguish between an RS of beam #0 and an RS of beam #2 and the same scrambling parameter may be used without any problem to distinguish between an RS of beam #1 and an RS of beam #3 because a pair of beams #1 and #3 and a pair of beams #0 and #2 are FDMed. In this way, the beam index $n_{beamID}$ may be used as the scrambling parameter.

Additionally, an RS offset is set per beam in order to distinguish between FDMed beams. For example, an RS offset of beams #0 and #2 may be set to 0 and an RS offset of beams #1 and #3 may be set to 3.

For RS multiplexing, the network may predefine a mapping relationship between a scrambling parameter and an RS offset of each beam or may signal the mapping relationship to the UE through higher layer signaling. Upon signaling information about all beams, the network may use broadcast signaling (e.g., a master information block (MIB) or a system information block (SIB)). If the network uses UE-specific signaling or UE group-specific signaling, the network may signal a mapping relationship between control information and an RS of each beam and a parameter of a multiplexing scheme in a beam association process between the network and the UE.

For example, the network may signal a scrambling parameter $n_{beamID}=0$ and an RS offset=0 to a UE associated with beams #0 and #2 and signal a scrambling parameter $n_{beamID}=1$ and an RS offset=2 to a UE associated with beams #1 and #3. Alternatively, in order to distinguish between beams on the same resource, the network may signal a scrambling parameter $n_{beamID}=0$ to the UE associated with beams #0 and #1 and signal a scrambling parameter $n_{beamID}=1$ to the UE associated with beams #2 and #3.

If this embodiment is applied to multiplexing of control RSs of digital beams within one analog beam, the beam ID may be replaced with a scrambling ID signaled by the eNB. In addition, if the SDM scheme is applied to multiplexing of RS ports, a term related to a port index may be additionally used for scrambling initialization.

As an example, when each beam of FIG. 8 means a layer or a digital beam and when each UE receives control information by single-port transmission, FIG. 8 may imply an MU-MIMO operation. Multiple UEs may be divided into a UE group to which orthogonal MU-MIMO caused by FDMed RSs is applied and a UE group to which orthogonal MU-MIMO caused by RS ports is applied. Additionally, MU-MIMO may be performed using a quasi-orthogonal scrambling sequence in the same port. To this end, the scrambling ID may be indicated to the UE. As another method, when port indices are given to respective SDMed layers, the UE may assume that scrambling of each RS is initialized by a port index.

[Single-Beam Operation Versus Multi-Beam Operation]

Hereinabove, the control information multiplexing method and the RS multiplexing method based on multiple analog beams have been described.

To apply the above embodiments to a single-beam operation, a default value may be defined with respect to every above-described parameter or each parameter value may be signaled by the network in the single-beam operation. In addition, a resource set in which the single-beam operation is performed and a resource set in which the multi-beam operation is performed may be separately configured and parameters for a single-beam operation mode/multi-beam operation mode may be signaled by the network.

For example, SDM, TDM, FDM, and CDM parameters introduced to support multiplexing of multiple analog beams may be fixed and may be predefined such that a specific value is substituted with a parameter associated with a beam index. For example, when beam multiplexing is performed by SDM, $n_{beamID}$ used as the scrambling parameter may be predefined to be fixed 0 or $n_{beamID}$ fixed to 0 may be signaled by the network. In the same manner, a code index used in CDM, an RS offset used in FDM, and a symbol index used in TDM may be predefined or may be signaled by the network.

<RS Configuration and RS Sequence Configuration Method>

Hereinabove, the control channel RS multiplexing method and control information multiplexing method for an MU-MIMO operation using analog or digital beams have been proposed and scrambling related parameters for SDM among the multiplexing methods have been proposed.

An embodiment of the present invention proposes RS configuration for raising efficiency of control channel transmission/reception and an RS sequence configuration method suitable for a 5G system.

In 3GPP TS36.211, scrambling initialization is defined according to RS type as shown in Table 1.

TABLE 1

| Reference Signal | Scrambling Initialization |
|---|---|
| CRS | $c_{init} = 2^{10} \cdot (7 \cdot (n_s + 1) + 1 + 1) \cdot (2 \cdot N_{ID}^{cell} + 1) + 2 \cdot N_{ID}^{cell} + N_{CP}$ |
| DMRS | $c_{init} = (\lfloor n_s/2 \rfloor + 1) \cdot (2n_{ID}^{(nSCID)} + 1) \cdot 2^{16} + n_{SCID}$ |
| EPDCCH DMRS | $c_{init} = (\lfloor n_s/2 \rfloor + 1) \cdot (2n_{ID,i}^{EPDCCH} + 1) \cdot 2^{16} + n_{SCID}^{EPDCCH}$ |

In addition, in 3GPP TS36.211, scrambling initialization is defined according to PDCCH control information and EPDCCH control information as shown in Table 2.

TABLE 2

| Control Channel | Scrambling Initialization |
|---|---|
| PDCCH Control Information | $c_{init} = \lfloor n_s/2 \rfloor 2^9 + N_{ID}^{cell}$ |
| EPDCCH Control Information | $c_{init} = \lfloor n_s/2 \rfloor \cdot 2^9 + N_{ID,m}^{EPDCCH}$ |

As shown in Table 2, a CRS is initialized according to a cell ID $N_{ID}^{cell}$, a slot number $n_s$, and CP type and an RS sequence is fixed in frames in which CP type is not changed.

On the other hand, in the case of a DMRS, $n_{ID}^{(nSCID)}$ and $n_{SCID}$ may be changed through higher layer signaling or DCI in order to perform MU-MIMO.

In the case of the EPDCCH, the network may configure two EPDCCH sets and a value of $n_{ID,i}^{EPDCCH}$ needed to initialize an EPDCCH DMRS per EPDCCH set is transmitted to the UE through higher layer signaling. This has been introduced to perform a dynamic cell selection (DCS) operation using different EPDCCH sets.

Scrambling initialization for the PDCCH is performed by the cell ID and scrambling initialization for the EPDCCH is performed by an EPDCCH set ID.

In NR, various requirements for control channels are proposed. For example, in the case of a URLLC scenario, fast channel decoding through latency reduction may be demanded and, in the case of an mMTC scenario, control channel capacity needs to increase to accommodate massive connectivity. In addition, it is necessary to increase flexibility of a network operation through seamless transmission point (TP) or cell switching.

According to an embodiment of the present invention, a scrambling initialization method for a control RS and information considering the above requirements is proposed.

[Scrambling Initialization]

As described above, the control RS and control information of LTE have been designed for inter-cell interference randomization and DCS per resource unit (e.g., EPDCCH set). However, in NR, consideration of intra-cell interference is further needed and a CoMP operation such as a dynamic TP within a cell may be needed.

To satisfy such requirements, an embodiment of the present invention newly proposes multi-UE-specific or UE-group-specific parameters as well as a cell-common parameter, for scrambling initialization of the control RS and control information. As a method of configuring the multi-UE-specific or UE-group-specific parameters, a plurality of values may be configured for one parameter.

In addition, the embodiment of the present invention may be applied only to a part of the control RS and control information or may be applied both to the control RS and the control information. In the following description, the UE-specific parameter may include a UE group-specific parameter.

Although Equations 1 and 2 below are indicated as including only the newly proposed parameter, this is for convenience of description and the equations may be changed according to parameters for an additional purpose (e.g., parameters for interference randomization between slots or mini-slots or control subband specific scrambling parameters).

As an example, scrambling initialization may be performed using a cell-common parameter $N_{common}$ and UE-specific parameters $N_{ue1}, N_{ue2}, \ldots, N_{ueM}$. $N_{common}$ may be a parameter which is cell or transmission/reception point (TRP) commonly configured. For example, a cell ID or a TRP ID may be defined as the cell common parameter. $N_{ueM}$ denotes a UE-specific parameter and M may be set to a number larger than 1 when it is desired to use $N_{ueM}$ according to each usage. For example, $N_{ue1}$ may be used for inter-cell interference coordination and $N_{ue2}$ may be used for intra-cell interference randomization. Equation 1 indicates an example of scrambling initialization.

$$C_{init}=N_{ue1}*2^{11}+N_{ue2}*2^{9}+N_{ID}^{cell} \quad \text{[Equation 1]}$$

In Equation 1, it is assumed that $N_{ue2}$ is a parameter for usage (e.g., cell/TRP selection) needed by 4 states and $N_{ue1}$ is a parameter for usage (e.g., control channel MU-MIMO) needed by X states.

In this way, when scrambling initialization for the control RS/control information is performed, $N_{ue1}$ and $N_{ue2}$ may be configured by higher layer signaling or by DCI during previous transmission. If there is no configured value, a default value (e.g., 0) may be predefined to be set.

As another method, the network may define only one UE-specific parameter and configure a plurality of values for the corresponding parameter. For example, scrambling initialization may be defined as indicated in Equation 2.

$$C_{init}=N_{ue1}*2^{9}+N_{ID}^{cell} \text{ or } C_{init}=N_{ue1}+N_{ID}^{cell} \quad \text{[Equation 2]}$$

If scrambling initialization is defined as indicated in Equation 2 and a plurality of values is configured for $N_{ue1}$, each UE may use all configured values of $N_{ue1}$ or values of $N_{ue1}$ usable for each UE may be limited.

Equation 2 may be simplified as $c_{init}=N_{ID}^{NR \; control}$. If $N_{ID}^{NR \; control}$ is not separately configured, the corresponding parameter may be replaced with a cell ID.

[Search Space]

The above embodiments may be applied to scrambling initialization of each search space of a control channel. For example, different scrambling initialization may be applied to each search space or a plurality of search spaces may be configured for one RS port.

When Equation 1 is applied to scrambling initialization for the control RS/control information, $N_{ue1}$ and $N_{ue2}$ may be set to 0 during scrambling initialization for a common search space (CSS) and $N_{ueM}$ configured by the network may be applied to a UE-specific search space (USS). That is, the UE may assume that cell-common scrambling initialization is performed in the CSS and UE-specific scrambling initialization is performed in the USS.

When an embodiment of the present invention is applied to the USS, a plurality of USSs may be configured for the same RS port of the same UE. For example, the network may configure two values for the UE as $N_{ue1}$ of Equation 2 and the UE may configure two search spaces based on scrambling initialization using each value of $N_{ue1}$. That is, the UE may perform blind detection (BD) by configuring different search spaces distinguished by scrambling on the same time/frequency resource. In this case, the number of BD operations of the UE for each search space may be predefined or may be configured by the network. For example, when the number of BD operations that the UE performs for a control channel is predefined, the number of BD operations for each USS may be determined to be a specific ratio (e.g., a value obtained by dividing the total number of BD operations that the UE can perform by a scrambling initialization number). Alternatively, a priority of each scrambling initialization may be determined to determine the number of BD operations for each search space. A BD priority or a BD ratio may be predefined or may be configured by the network (e.g., through higher layer signaling or previous DCI).

The BD priority configured for each search space or each scrambling initialization parameter may also be used for fallback to solve ambiguity during a duration in which a scrambling parameter is signaled. For example, when default scrambling initialization is defined between the network and the UE and the UE is configured to perform BD operations in a corresponding search space multiple times, control signaling may be predefined or configured to be performed based on default scrambling initialization in a corresponding search space during an ambiguity duration of scrambling parameter signaling.

According to type of a search space, the number of BD operations may be determined. For example, when the number of BD operations for the CSS and the number of BD operations for the USS are defined and a plurality of search spaces is defined, the UE may separately apply the predefined number of BD operations to each search space according to criterion such as priority.

[Length and Mapping of Scrambling Sequence]

A scrambling sequence length and a scrambling sequence mapping scheme of legacy LTE will now be described. First, the eNB/UE generates a scrambling sequence by assuming that the maximum number of RBs that DL supports for each RS is 110 and extracts a scrambling sequence part corresponding to a control region in which BD should be performed from a scrambling sequence corresponding to the maximum number of RBs.

In NR, a plurality of subbands having different numerologies may be present in one system bandwidth and RS density per numerology may differ. In addition, if different load may be assigned to each numerology, the number of control symbols may be differently configured per numerology.

Accordingly, it is difficult to use, in NR, a scrambling sequence length and a mapping scheme of the legacy LTE system. That is, in NR, it is undesirable for the UE to generate one scrambling sequence in the unit of system bandwidth and then extract a scrambling sequence subset corresponding to a region allocated to the UE or a region in which the UE performs BD.

To solve such a problem, an embodiment of the present invention proposes methods of determining the length of a scrambling sequence when system bandwidth is configured by subbands having different numerologies. The following methods may be implemented alone or by a combination thereof. When a scrambling sequence is defined with respect to each search space, a scrambling sequence for each search space may be configured by different methods among the following methods.

(1) Generation of Sequence of Length Corresponding to System Bandwidth for Numerology The UE may generate a sequence of length corresponding to system bandwidth.

For example, when a UE supporting only a specific numerology monitors a corresponding subband, the UE may be aware of an absolute frequency position of a subband that the UE monitors and the bandwidth of the subband but is not aware of at which part the monitored subband is located in an entire system bandwidth of a corresponding cell. In other words, the UE is not aware of a relative position of the subband that the UE monitors in the entire system bandwidth. Therefore, there may be ambiguity because the UE is not aware of a part that the UE should extract from a generated scrambling sequence after the UE generates a scrambling sequence having a length corresponding to the entire system bandwidth.

According to an embodiment of the present invention, the network may indicate RB index related information of each numerology using an SIB, an MIB, or RRC signaling. As an example, when the network signals control subband information, the network may indicate an index of a start RB of each subband. In other words, the network may indicate a position in system bandwidth of the corresponding RB based on a numerology to which each subband belongs. In this way, it is necessary to signal a relative position of each numerology region.

The UE may generate a sequence of the same length with respect to each numerology and determine a sequence at a position to which a specific numerology is applied based on a relative position of a corresponding subband in system bandwidth.

(2) Generation of Sequence of each Frequency Domain Resource Unit to which One Numerology is Applied In this example, a subband is distinguished from a control subband and may imply consecutive resources in frequency to which the same numerology is applied.

To this end, the network may broadcast the size of each subband in the frequency domain and/or information about a starting/ending frequency of a subband or indicate the same through higher layer signaling.

(3) Generation of Scrambling Sequence of Each Control Subband

The network may inform a UE of control subband related information and each UE may assume that a scrambling sequence is generated per control subband. The meaning of "the scrambling sequence is generated per control subband" may be interpreted as indicating that the scrambling sequence is generated per CORESET.

In NR, a search space and CORESET will now be briefly described. The search space may be configured on CORESET. CORESET is a set of resources for control signal transmission. An eNB may signal information about CORESET to the UE. The search space may be defined as a set of control channel candidates for which the UE performs BD. One CORESET may be defined in one search space. For example, CORESET for a CSS and CORESET for a USS may be configured. Alternatively, a plurality of search spaces may be defined for one CORESET. As an example, the CSS and the USS may be configured for the same CORESET.

(4) Generation of scrambling sequence based on time/frequency resource on which specific signal is transmitted Unlike LTE, in NR, a synchronization signal may be transmitted on an arbitrary resource other than the center of system bandwidth and an MIB transmitted through a PBCH may not include information about the system bandwidth. In addition, regardless of the system bandwidth, a subband in which each UE operates may be separately configured.

Thus, if the UE is not aware of a center position of the system bandwidth or cannot be aware of the system bandwidth, the total length of a scrambling sequence of a control RS and/or control information and resource mapping need to be defined.

The length of the scrambling sequence may be determined by the above scheme proposed in (1), (2), or (3). Resource mapping may be performed based on a center frequency of a region in which the synchronization signal or the MIB is transmitted. As an example, the UE may determine the length of the scrambling sequence based on a predefined maximum bandwidth of each numerology. The UE may assume that a center frequency of a maximum bandwidth assumed to generate the scrambling sequence is identical to a center frequency of a synchronization signal and/or MIB transport channel.

(5) Generation of Scrambling Sequence Based on Operation Bandwidth of Each UE

In NR, operation bandwidth of each UE may be configured separately from system bandwidth and this may be caused by RF capability of each UE. In this case, the UE may generate the scrambling sequence based on operation bandwidth allocated thereto or generate the scrambling sequence based on a maximum value that the operation bandwidth of each UE can have. Next, the UE may map a subset of the scrambling sequence to operation bandwidth thereof.

[Mapping of Subband Specific Control Channel Element]

Figure 9:
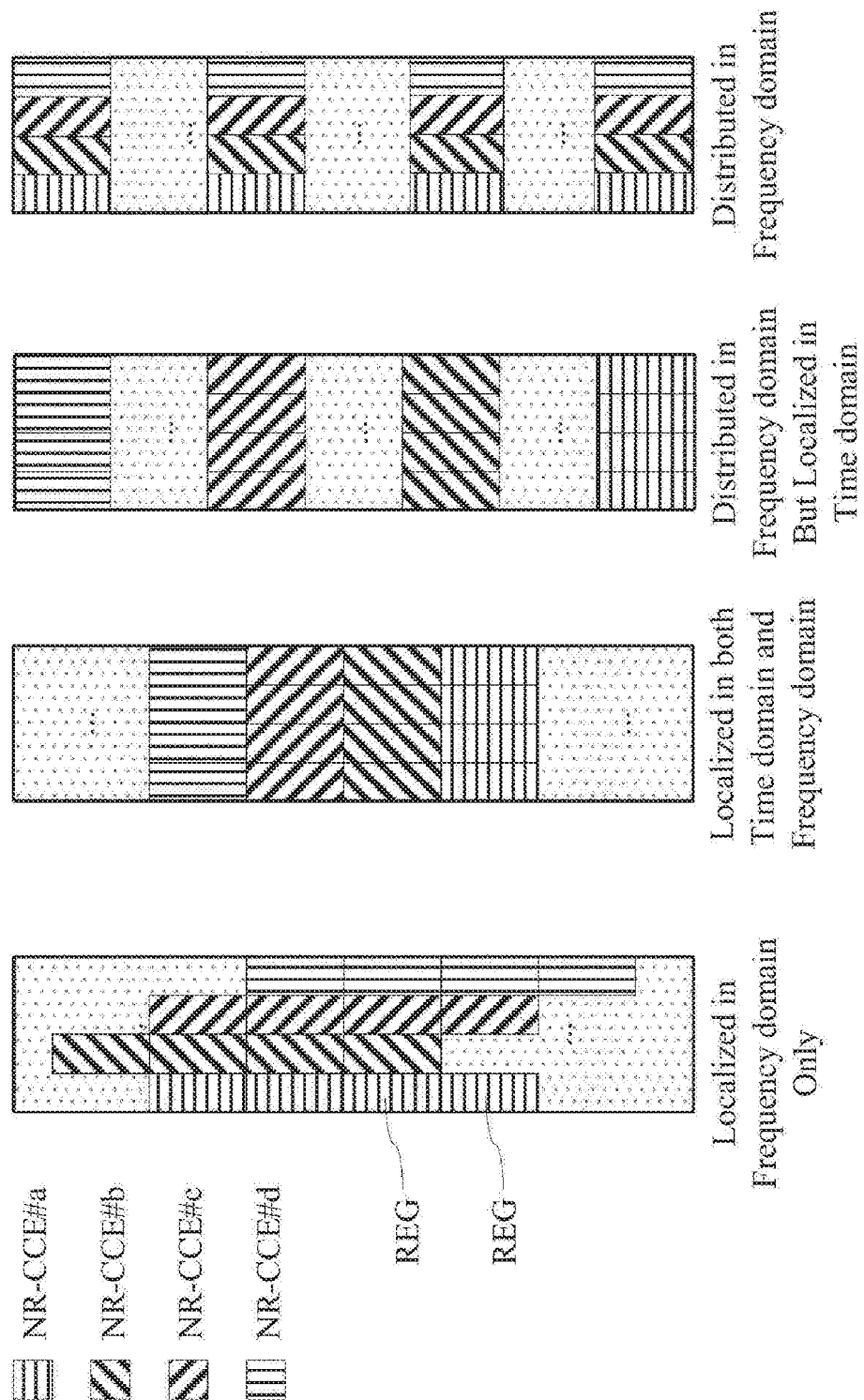
FIG. 9 illustrates a scheme of mapping a resource element group (REG) to a control channel element (CCE) in NR.

FIG. 9 illustrates a scheme of mapping a resource element group (REG) to a control channel element (CCE) in NR.

In FIG. 9, one unit resource may be defined as an REG or as a subset constituting a CCE. In FIG. 9, it is assumed that one CCE includes 4 REGs. In FIG. 9, the x axis denotes the time domain and each unit of the x axis means an OFDM symbol. The y axis corresponds to the frequency domain and each unit of the y axis means a set of REs constituting the REG.

A localized REG-to-CCE mapping scheme in the time domain is advantageous in that RS overhead is reduced and coding rate is increased but may be inappropriate when it is desired to transmit multiple analog beams in the same subframe.

On the other hand, a localized REG-to-CCE mapping scheme in the frequency domain is disadvantageous in that RS overhead is increased but more accurate channel estimation may be expected.

Since each REG-to-CCE mapping scheme has advantages and disadvantages, an embodiment of the present invention proposes configuration to use a different type of REG-to-CCE mapping scheme per specific resource unit (e.g., control subband). To reduce ambiguity of a configuration process, the REG-to-CCE mapping scheme of a partial resource region may be fixed.

The REG-to-CCE mapping scheme according to the present invention may also consider an additional mapping scheme (e.g., distributed in both the time and frequency domains) including cases illustrated in FIG. 9.

The REG-to-CCE mapping scheme configured for each specific resource unit may be indicated to the UE using higher layer signaling, broadcast/multicast signaling, or previous DCI.

For example, a CSS and/or a specific USS among USSs may be fixed to perform localized REG-to-CCE mapping only in the frequency domain and the REG-to-CCE mapping scheme in the other search spaces may be configured by a CSS, a broadcast signal, and/or a specific USS.

Although the above description has been given focusing on REG-to-CCE mapping, the present embodiment may also be applied to CCE aggregation. In this case, it may be assumed that each resource unit of FIG. 9 is a CCE and the above-described REG-to-CCE mapping scheme may be equally applied to CCE aggregation.

Figure 10:
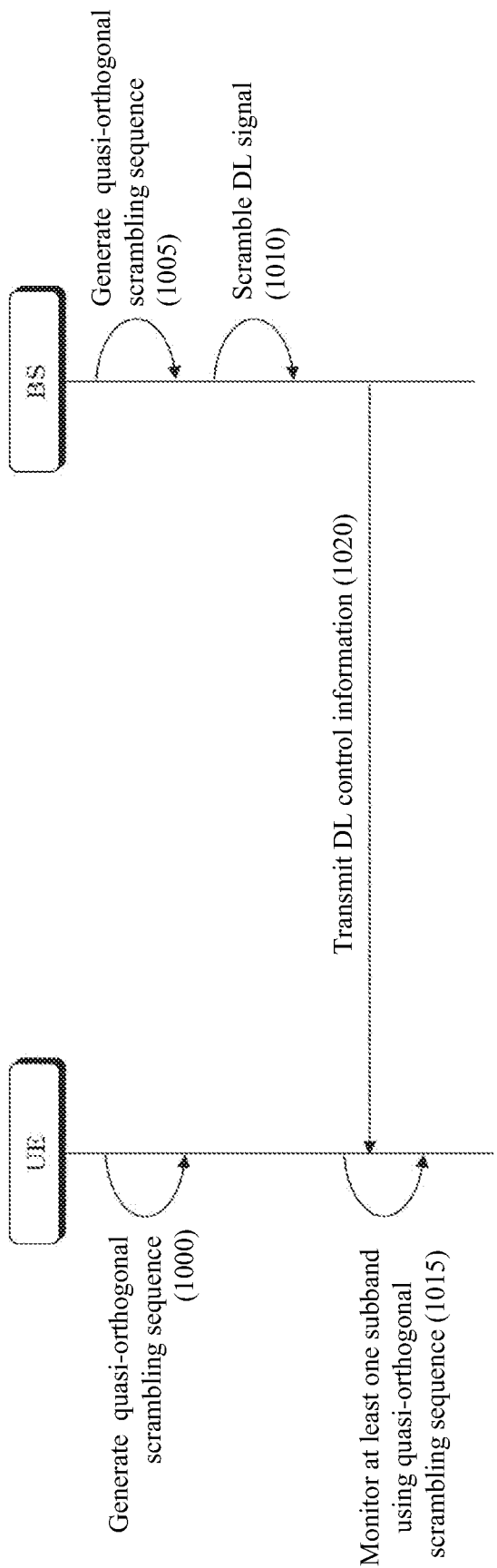
FIG. 10 illustrates a method of transmitting and receiving a DL signal through a plurality of multiplexed beams.

FIG. 10 illustrates a method of transmitting and receiving a DL signal through a plurality of multiplexed beams. A description of a repetitive part given in the above description may be omitted.

In FIG. 10, it is assumed that a BS operates at least one cell in which a plurality of beams are multiplexed.

The BS generates a quasi-orthogonal scrambling sequence in consideration of at least one beam through which a DL signal is to be transmitted among a plurality of beams (1005). In generating the quasi-orthogonal scrambling sequence, the BS may initialize the quasi-orthogonal scrambling sequence using a beam-specific parameter corresponding to the at least one beam transmitting the DL signal. The initialization of the quasi-orthogonal scrambling sequence may be performed for a predetermined interval rather than performed for every sequence generation.

The BS scrambles the DL signal using the quasi-orthogonal scrambling sequence (1010).

The BS transmits the DL signal to the UE through at least one beam (1020).

To correctly receive the DL signal, the UE should be aware of the quasi-orthogonal scrambling sequence used for scrambling the DL signal.

Accordingly, the UE generates the quasi-orthogonal scrambling sequence used for scrambling the DL signal (1000). In generating the quasi-orthogonal scrambling sequence, the UE may initialize the quasi-orthogonal scrambling sequence using a beam-specific parameter corresponding to the at least one beam.

The beam-specific parameter may be a beam index allocated to the at least one beam.

The quasi-orthogonal scrambling sequence may be initialized using '$n_{beamID}*2^X$', wherein '$n_{beamID}$' represents the beam index, and 'X' may be a value determined based on the maximum number of the multiple multiplexed beams.

The UE may receive '$n_{beamID}$' of each of the plurality of beams.

Next, the UE monitors at least one subband using the quasi-orthogonal scrambling sequence (1015). For example, the UE receives the DL signal through at least one beam among the multiplexed plurality of beams using the quasi-orthogonal scrambling sequence. The DL signal may be DCI or a DL RS. The UE may descramble the DCI or a channel on which the DL RS signal is received, using the quasi-orthogonal scrambling sequence.

The UE may receive information about a relative position of a subband that the UE monitors in a system band of a cell.

In generating the quasi-orthogonal scrambling sequence, the UE may generate the entire quasi-orthogonal scrambling sequence having a length corresponding to the system band of the cell and extract a part corresponding to the relative position of the subband that the UE monitors from the entire quasi-orthogonal scrambling sequence.

Among the plurality of beams, beams having a correlation less than a threshold value are multiplexed by an SDM scheme using the quasi-orthogonal scrambling sequence and beams having a correlation greater than the threshold value may be multiplexed by one of FDM, TDM, and CDM.

Figure 11:
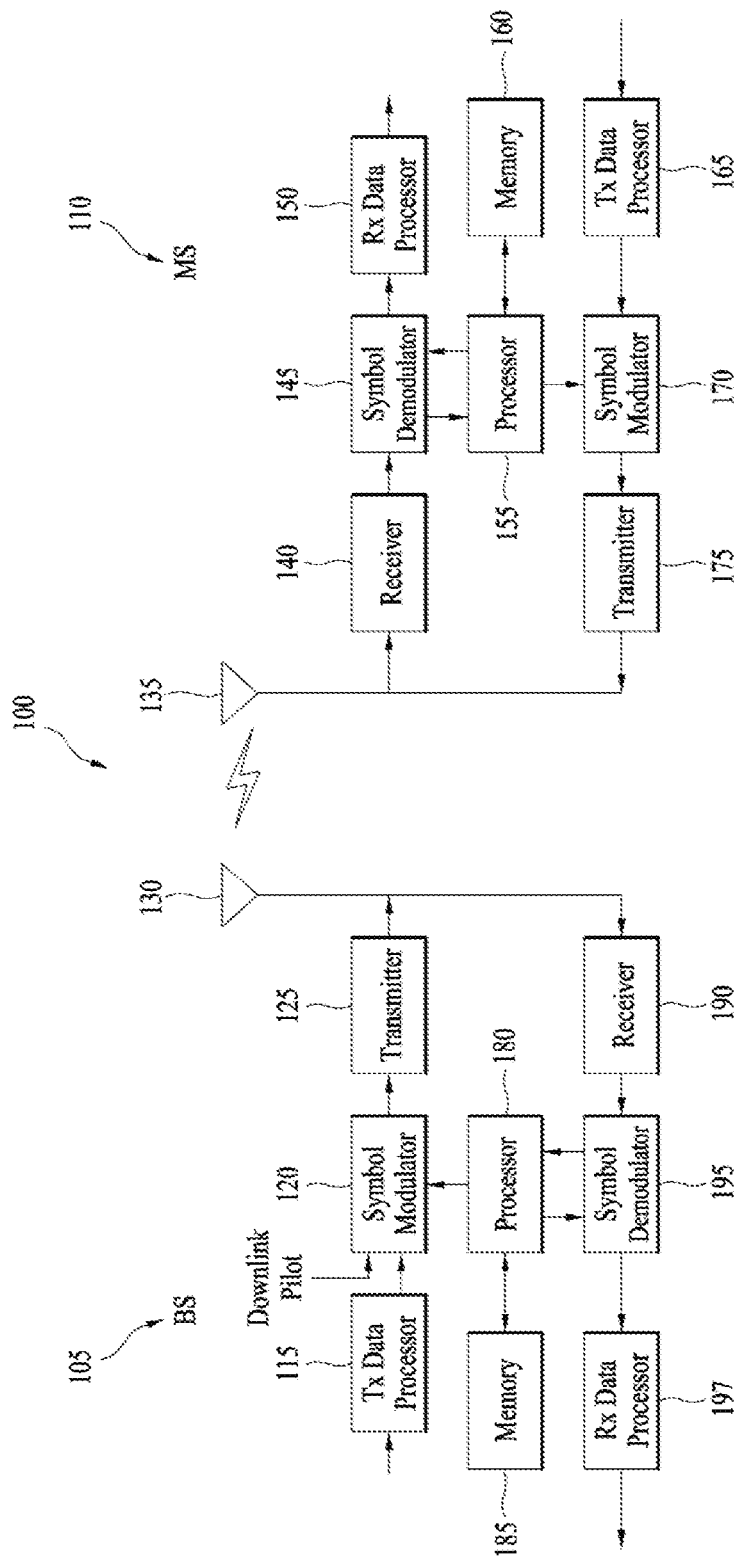
FIG. 11 illustrates a user equipment and a base station according to an embodiment of the present invention.

FIG. 11 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

A base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

The invention claimed is:

1. A method of receiving a downlink signal, by a user equipment (UE), from a cell in which a plurality of beams are multiplexed in a wireless communication system, the method comprising:
generating a quasi-orthogonal scrambling sequence used for scrambling the downlink signal; and
receiving the downlink signal through at least one beam among the multiplexed plurality of beams, using the generated quasi-orthogonal scrambling sequence,
wherein in the generation of the quasi-orthogonal scrambling sequence, the UE initializes the quasi-orthogonal scrambling sequence using a beam-specific parameter corresponding to the at least one beam for transmitting the downlink signal.

2. The method of claim 1,
wherein the beam-specific parameter is a beam index allocated to the at least one beam.

3. The method of claim 2,
wherein the quasi-orthogonal scrambling sequence is initialized using '$n_{beamID}*2^X$', where '$n_{beamID}$' denotes the beam index, and 'X' is a value determined based on a maximum number of the multiplexed plurality of beams.

4. The method of claim 3, further comprising:
receiving '$n_{beamID}$' for each of the plurality of beams from the cell.

5. The method of claim 1, further comprising:
receiving information about a relative position of a sub-band that the UE monitors in a system band of the cell.

6. The method of claim 5, wherein in the generation of the quasi-orthogonal scrambling sequence, the UE generates an entire quasi-orthogonal scrambling sequence having a length corresponding to the system band of the cell and extracts a part that corresponds to the relative position of the subband that the UE monitors from the entire quasi-orthogonal scrambling sequence.

7. The method of claim 1,
wherein the downlink signal is downlink control information or a downlink reference signal and
wherein the UE descrambles the downlink control information or estimates a channel on which the downlink reference signal is received, using the quasi-orthogonal scrambling sequence.

8. The method of claim 1,
wherein beams having a correlation less than a threshold value among the plurality of beams are multiplexed by a spatial divisional multiplexing (SDM) scheme using the quasi-orthogonal scrambling sequence and beams having a correlation greater than the threshold value are multiplexed by at least one of frequency divisional multiplexing (FDM), time divisional multiplexing (TDM), and code divisional multiplexing (CDM) schemes.

9. A method of transmitting a downlink signal by a base station (BS) having a cell in which a plurality of beams are multiplexed in a wireless communication system, the method comprising:
generating a quasi-orthogonal scrambling sequence in consideration of at least one beam through which the downlink signal is to be transmitted among the multiplexed plurality of beams;
scrambling the downlink signal using the generated quasi-orthogonal scrambling sequence; and
transmitting the downlink signal through at least one beam to a user equipment (UE),
wherein in the generation of quasi-orthogonal scrambling sequence, the BS initializes the quasi-orthogonal scrambling sequence using a beam-specific parameter corresponding to the at least one beam for transmitting the downlink signal.

10. The method of claim 9,
wherein the beam-specific parameter is a beam index allocated to the at least one beam.

11. The method of claim 10,
wherein the quasi-orthogonal scrambling sequence is initialized using '$n_{beamID}*2^X$', where '$n_{beamID}$' denotes the beam index, and 'X' is a value determined based on the maximum number of the multiplexed plurality of beams.

12. The method of claim 11, further comprising:
transmitting '$n_{beamID}$' for each of the plurality of beams.

13. The method of claim 9, further comprising:
transmitting information about a relative position of a subband that the UE monitors in a system band of the cell.

14. A user equipment (UE) for receiving a downlink signal from a cell in which a plurality of beams are multiplexed, the UE comprising:
a processor to generate a quasi-orthogonal scrambling sequence used for scrambling the downlink signal; and
a receiver to receive the downlink signal through at least one beam among the multiplexed plurality of beams, using the generated quasi-orthogonal scrambling sequence, under control of the processor,
wherein in the generation of the quasi-orthogonal scrambling sequence, the processor initializes the quasi-orthogonal scrambling sequence using a beam-specific parameter corresponding to the at least one beam for transmitting the downlink signal.

15. A base station (BS) having a cell in which a plurality of beams are multiplexed, the BS comprising:
a processor to generate a quasi-orthogonal scrambling sequence in consideration of at least one beam through which a downlink signal is to be transmitted among the multiplexed plurality of beams and to scramble the downlink signal using the generated quasi-orthogonal scrambling sequence; and
a transmitter to transmit the downlink signal through at least one beam to a user equipment (UE) under control of the processor,
wherein in generation of the quasi-orthogonal scrambling sequence, the processor initializes the quasi-orthogonal scrambling sequence using a beam-specific parameter corresponding to the at least one beam for transmitting the downlink signal.

* * * * *